(12) United States Patent
Claycomb et al.

(10) Patent No.: US 7,083,575 B1
(45) Date of Patent: Aug. 1, 2006

(54) ELECTRONIC ESTRUS DETECTION DEVICE

(75) Inventors: Rodney Claycomb, Millville, PA (US); Scott Clark, Denver, CO (US); Thomas Ebben, Lafayette, CO (US); Shawn Koch, Denver, CO (US); Jake Olson, Westminster, CO (US)

(73) Assignee: CowChips, LLC, Denver, CO (US)

( * ) Notice: Subject to any disclaimer, the term of this patent is extended or adjusted under 35 U.S.C. 154(b) by 0 days.

(21) Appl. No.: 09/470,116

(22) Filed: Dec. 22, 1999

Related U.S. Application Data (60) Provisional application No. 60/113,202, filed on Dec. 22, 1998.

(51) Int. Cl.
*A61B 10/00* (2006.01)
*A61B 17/43* (2006.01)

(52) U.S. Cl. .......................... 600/551; 600/33
(58) Field of Classification Search ................ 600/33, 600/551, 587; 340/573.3; 119/174, 421
See application file for complete search history.

(56) References Cited

U.S. PATENT DOCUMENTS

| | | | | |
|---|---|---|---|---|
| 4,206,766 A | * | 6/1980 | Bielka | 600/551 |
| 4,455,610 A | * | 6/1984 | Rodrian | 600/551 |
| 4,503,808 A | * | 3/1985 | McAlister | 600/551 |
| 4,635,587 A | * | 1/1987 | Leonardo | 600/551 |
| 4,685,421 A | * | 8/1987 | Colburn, Jr. | 600/551 |
| 4,696,258 A | * | 9/1987 | Magrath et al. | 600/551 |
| 4,846,106 A | * | 7/1989 | Leonardo | 600/551 |
| 4,895,165 A | * | 1/1990 | Blair | 600/551 |
| 5,111,799 A | * | 5/1992 | Senger et al. | 600/551 |
| 5,542,431 A | * | 8/1996 | Starzl et al. | 600/551 |
| 5,566,679 A | * | 10/1996 | Herriott | 600/551 |

OTHER PUBLICATIONS

M.B.G. Dransfield, R. L. Nebel, R. E. Pearson, and L. D. Warnick; "Timing of Insemination for Dairy Cows Identified in Estrus by a Radiotelemetric Estrus Detection System"; Journal of Dairy Science vol. 81, No. 7, 1998; pp. 1874-1882.

* cited by examiner

*Primary Examiner*—Robert L. Nasser
*Assistant Examiner*—Navin Natnithithadha
(74) *Attorney, Agent, or Firm*—Dorsey & Whitney LLP (57) ABSTRACT

An electronic device for detecting estrus that may be affixed to the tail-head area of a cow is described. This device permits the accurate determination of optimal breeding time, natural or artificial, based on mounting activity. The device includes a water resistant housing, within which is contained the electronic portion of the device consisting of a controller means, a power means, an activation means, a read data means, and at least one display means; said device determining and subsequently indicating suspected and confirmed estrus based on an algorithm. The invention may be used, for example, with any non-human animal exhibiting standing heats and/or mounting behavior indicative of an estrus cycle for making mounting data determinations related to the estrus cycle and analyzing such data to determine optimal time to breed.

18 Claims, 10 Drawing Sheets

ELECTRONIC ESTRUS DETECTION DEVICE

RELEATED APPLICATIONS

This application claims priority to provisional patent application U.S. Ser. No. 60/113,202, filed 22 Dec. 1998. The earlier filing date of this application is hereby claimed.

FIELD OF THE INVENTION

The present invention relates to the general field of estrus detection, and more specifically, to an electronic device for attachment to the posterior of a cow that counts and times mounts by other cows. This application, thus, describes an electronic device useful for determination of estrus, said device enabling, for example, an artificial insemination technician to appropriately determine the optimum time of insemination and/or breeding, thereby increasing number of pregnancies and reducing the number of open cows, and in turn, increasing milk and/or meat production.

BACKGROUND AND PRIOR ART

Animal husbandry technique advancement, including for example, computerized genetic selection and/or tracking and artificial insemination (AI) allows both dairy farmers and beef producers to optimize genetically linked cattle characteristics through breeding programs. Such characteristics may include, for example, udder size and placement, animal size, milk or meat productivity and disease resistance. The goal of a breeding program, whether it employs live cover or artificial insemination, is to develop and further certain characteristics of a herd. For example, dairy farmers select to increase and maximize the milk production of each and every cow in their herd. To do so, it is necessary to minimize the number of days open between pregnancies by impregnating a cow as soon as possible after calving.

Successful breeding programs must incorporate efficient and accurate detection of estrus and timely breeding. Estrus detection may be the most common and costly failure of breeding programs. Inefficient detection of estrus results in lost lifetime milk yield in dairy cows, decreased number of calves born per lifetime, excessive days open, and increased reproductive culling (Walker et al. (1996) *J. Dairy Sci.* 79:1555). Requirements for an "ideal" system for estrus detection have been listed as: 24-hour continuous surveillance, accurate and automatic identification of cows in estrus, operational for the productive life of the cow, reduced or eliminated labor requirements, and highly accurate identification of behavioral estrus events that correlate with ovulation (Senger (1994) *J. Dairy Sci.* 77:2745). Historically, the object of such a system has been to detect the first mount of standing estrus—the true onset of estrus.

Behavioral indicators of cattle estrus include, for example, increased physical activity and mobility, increased vocalizations and certain mounting behaviors. During estrus there is an increased frequency of mounting of other cattle by the animal in heat. Also, cows in heat will allow themselves to be mounted and remain mounted by other cows. This mating behavior—standing to be mounted—is particularly relevant to the instant invention. A standing heat, a prolonged mounted standing posture is maintained only during estrus cycle.

A cow's estrus cycle is approximately 21 days. Therefore, a cow comes into heat approximately every 21 days and remains in heat for approximately 10–12 hours. Approximately 14 hours thereafter, the cow ovulates. Time of ovulation is a relatively fixed reproductive event, taking place within approximately 40 hours of onset of estrus (Walker et al., Supra). The optimum time for breeding, either live cover or artificial insemination; to achieve pregnancy is between 4 and 12 hours after the onset of estrus. Further, conception rates are highest for cows that are bred from 4 to 14 hours following the first standing event of estrus. The probability of pregnancy is also affected by standing events per estrus. Specifically, cows exhibiting less than 3 standing events prior to insemination have 41% lower odds of pregnancy than cows inseminated following greater than or equal to 3 standing events (Dransfield et al. (1998) *J. Dairy Sci.* 81:1874). Simple mathematical calculations may be performed to determine optimum breeding time if the onset of estrus is known. Also, a known time of ovulation in reference to the first mount of estrus and being able to identify the first mount allows for accurate timing of breeding (Walker et al., Supra); more accurate timing relative to estrus detection based on visual observation of estrus. If the onset of estrus is unknown, insemination should be performed within 4 to 12 hours of observation of estrus (Dransfield et al., Supra). Based on a 280-day pregnancy, after which calving occurs, it is necessary to impregnate that cow within 45–60 days after calving to optimize production. Therefore, accurate and optimal breeding times must be determined to prevent economic loss, currently estimated at more than $300 million annually to the U.S. dairy industry because of failure to detect estrus (Senger, Supra). Hence, a preferred system must determine estrus based on a threshold of 3 mounts in 4 hours, so that insemination may be performed in a timely manner. That is, at an optimal point in time.

The prior art discloses several different types of estrus detection, both electronic and manual. Relevant prior art includes U.S. Pat. Nos. 4,895,165, 3,844,273, 5,111,799 and 4,635,5876. However, prior attempts at detection of estrus in cattle have proven unsatisfactory. In U.S. Pat. No. 4,895,165 to Blair, entitled ELECTRONIC ESTRUS DETECTOR, an affixable electronic estrus detector that stores and displays the number of mounts by another cow as determined by a force responsive switch is disclosed. Said detector may measure increments of mounts or may be modified to indicate estrus based on a mount-second index. Either embodiment is a counting device requiring manual daily checks of each detector, and thus, close proximity observation of each cow.

A METHOD AND APPARATUS FOR ANIMAL HEAT DETECTION AND RECORDING is disclosed in U.S. Pat. No. 3,844,273 to Polson. An electronic apparatus, specifically a transmitter, is attached to a female animal. The transmitter is activated by mounting activity, and in turn, transmits a signal to a receiver, fixed or mobile. The apparatus further provides a timer that is concurrently activated and records the passage of time.

Next, A fully automated, surgically implantable device for estrus detection is disclosed in U.S. Pat. No. 5,111,799 to Senger et al., entitled ESTROUS DETECTION SYSTEMS. A force responsive sensor provides data regarding mounting behavior and standing heat mount occurrence during a fixed period that are compared to a threshold, thereby determining estrus. Upon determination, a signal is broadcast to a receiver, allowing the herdsman to breed or inseminate based thereon. This device precludes the necessity of daily, direct animal observation through the use of a computer system and telemetric signals. However, implanted devices, subcutaneous or otherwise, present a number of issues, for example, surgical implantation of the device itself, retrieval of a failed device, retrieval of devices from culled animals, infection at the implantation site and rejection of the device.

Finally, Leonardo (U.S. Pat. No. 4,635,587, METHOD AND APPARATUS FOR DETECTING STANDING HEAT IN CATTLE) discloses an electronic module, including a readout display and indicators connected to a membrane switch actuated by mounting activity. Said module is housed in a sleeve that is adhered to the tail-base of a cow. When mounted, the switch actuates the timer and indicators. In one embodiment, the display flashes, indicating estrus. Said device detects the onset of estrus.

Despite these attempts to detect estrus, none of the prior art satisfactorily solves the problem of how to reliably and efficiently detect estrus and/or the optimal breeding time. Shortcomings found in the prior art include, for example, the detection of the onset of estrus rather than detection of estrus, the necessity of surgical procedures, and the necessity of complex and/or computer-based systems. For these reasons, as well as others, visual observation of cow behavior and fully automated cow monitoring systems continue to be the primary techniques used for estrus determination in cattle. However, only 50% of the cows displaying behavior indications of estrus are detected by visual monitoring. Close to 100% accuracy may be achieved with a fully automated and computerized system, such as HeatWatch® (U.S. Pat. No. 5,542,431 specifically incorporated herein by reference, DDx, Inc., Denver, Colo.). Such fully automated cow monitoring systems are expensive and inappropriate for use with, for example, small herds. The present invention overcomes these drawbacks, fulfilling the need for accurate and economical estrus detection, by integral incorporation of a water-resistant, self-contained, battery operated, estrus detection device for determination of estrus that is affixed to the tail-head area of a cow; said device indicating suspected heat, confirmed heat and/or time to breed by pulsing LED or LEDs and/or various visual indicators. Suspected and confirmed estrus detection and subsequent optimum time to breed determination are based on data processing algorithms incorporating the statistics discussed supra regarding number of mounts per hour, and simple user observation of the device indicates which cow or cows to further monitor and/or breed.

SUMMARY OF THE INVENTION

This invention is based on a novel concept for determination of optimal insemination timing in cattle in order to result in maximum production levels—milk and beef. In accordance with the present invention, a self-contained, water-resistant, battery operated, estrus detection device for determination of optimal breeding time that is affixed to the tail-head area of a cow is disclosed; said device indicating suspected heat, confirmed heat and/or time to breed by visible indicator or indicators, e.g., LED. Suspected estrus, confirmed estrus and optimum breeding time detection is determined by the application of heat mount data input to an algorithm or algorithms incorporating mounting frequency and duration, and more specifically, the number of mounts per hour, the number of mounts per estrus or the number of mounts per time period. Simple user observation of the device indicates which cow or cows to further monitor and/or breed.

The present invention is a self-contained electronic estrus detection device for optimum breeding time calculation and indication. The device has a housing for releasable placement on an animal and an electronic means operatively associated with the housing for detecting and processing information relating to number, duration, and frequency of mounts on the animal. The electronic means calculates and indicates optimum time to breed based on the detected and processed information. The information includes if the duration of the mounts meet a preset threshold of time and if a preset number of the mounts occur within a predetermined period of time.

The present invention is also a self-contained electronic estrus detection device having a housing for releasable placement on an animal and an indicating means for indicating suspect estrus, confirmed estrus and optimum time to breed. Suspect estrus is determined by the duration of a first mount meeting a preset threshold of time. Confirmed estrus is determined by a duration of the mount meeting a preset threshold of time and a preset number of mounts within a predetermined period time. Optimum time to breed is a predetermined range of time from the first of the preset number of mounts meeting the preset threshold and occurring within the predetermined period time. The predetermined range of time for dairy cows is between four hours and fourteen hours from the first of the preset number of mounts meeting the preset threshold and occurring within the predetermined period of time.

The present invention is a self-contained, watertight detection device for optimum breeding time calculation including a housing and an electronic means for detecting, processing and indicating mounting activity data housed therein. Said electronic means may include a controller means, a processing means, a power means, an activation means and at least one indicating means. More specifically, the electronic means includes an internal controller chip, a power source, a pressure sensitive switch, and at least one visible indicator display. It may further include a read data switch and a digital display; said device is programmed to be capable of applying an algorithm to actual mounting data and detecting estrus and determining optimal breeding time based thereon. In one embodiment, the controller means is a microprocessor, the power means includes at least one battery, the activation means is a force activated switch and the indicating means includes at least one LED. The electronic means of the estrus detection device detects mounting activity, actuating the processing means according to preprogrammed thresholds and visibly indicates satisfaction of said thresholds.

The device is affixed to the tailhead area of a cow, for example, within a patch intended for such use, via a tail-wrap or tail sheath assembly adapted for device retention or combinations thereof. The pressure sensitive switch is, thus, positioned such that mounting activity actuates the switch that in turn actuates an incremented counter, count up function timer, data processor and visible display.

The assembly or housing of the instant invention is highly suitable for the above-stated purposes as it is made from any number of plastic, or the like, material, for example, ABS plastic, polypropylene or polycarbonate. It is sealable for water resistance and has adjustable and/or replaceable parts. While prior art is suitable for some aspects of estrus and estrus onset detection, none of the prior art employs an algorithm or the like within a simple electronic device for determination of estrus, and thus, does not provide the breeding or insemination accuracy necessary for productivity, and in turn, profit. The instant invention is a simple, reliable, self-contained electronic device for estrus detection that employs an algorithm to determine optimal insemination time.

The present invention, when practiced as disclosed herein, accurately detects estrus and optimal breeding time and indicates same via simple observation of the device. Said device is applicable to all non-human animals displaying estrus cycle and mounting related activities. The instant invention, thus, is useful in dairy and beef cattle estrus detection, but is not intended to be limited thereto.

In broad terms, the instant device is a self-contained, battery operated device that determines estrus and optimal breeding time based on an algorithm for accurate estrus detection and displays visible signals indicative of the same.

In a preferred embodiment, the electronic device is encased and sealed in a clear housing facilitating water resistance and optimal visible signal observation from a variety of angles or vantage points. In an alternate embodiment, the power source portion of the device is encased in its own sealed housing adapted to functionally integrate with the remainder of the device, thereby facilitating part removal and/or replacement.

A number of salient features of the present invention are readily recognized. An electronic estrus detection device is provided that obtains mounting activity related data and may incorporate other relevant factors in making optimum breeding time determinations and indications. The present system is capable of computer hardware and/or software integration for data storage, however such function is in addition to the primary function of optimum breeding time determination.

All embodiments of the instant invention include the same general methodologies, objects and elements; an electronic estrus detection device including a housing in which electronic components for estrus detection are housed. More specifically, such electronic components may include an internal controller chip, a power source, a pressure sensitive switch, a read data switch, a digital display and a visible indicator or a plurality of visible indicators substituted therefor, all of which are encased in a hermetically sealed housing and may further comprise other customizing features and specifications, for example, integrated motion sensors or alternate data analysis/presentation elements. Other features and advantages of the present invention will become apparent from the following detailed description, taken in conjunction with the accompanying figures, which illustrate by way of example, the principles of the instant invention.

BRIEF DESCRIPTION OF THE DRAWINGS

FIG. 5b is a side view of a preferred embodiment of the estrus detection device of the instant device depicted in FIGS. 1 and 5a.

FIG. 6b is a side view of a preferred embodiment of the estrus detection device of the instant device depicted in FIGS. 2 and 6a.

DETAILED DESCRIPTION

It is to be understood that both the foregoing general description and the following detailed description are exemplary and explanatory only and are not restrictive of the invention as claimed.

The present invention provides an electronic estrus detection device useful for optimal timing of insemination in cattle by determination and counting of mounting activity related to the estrus cycle. It is recognized by those skilled in the art that a broad range of estrus detection devices may be practiced in accordance with the presently disclosed invention.

Figure 1:
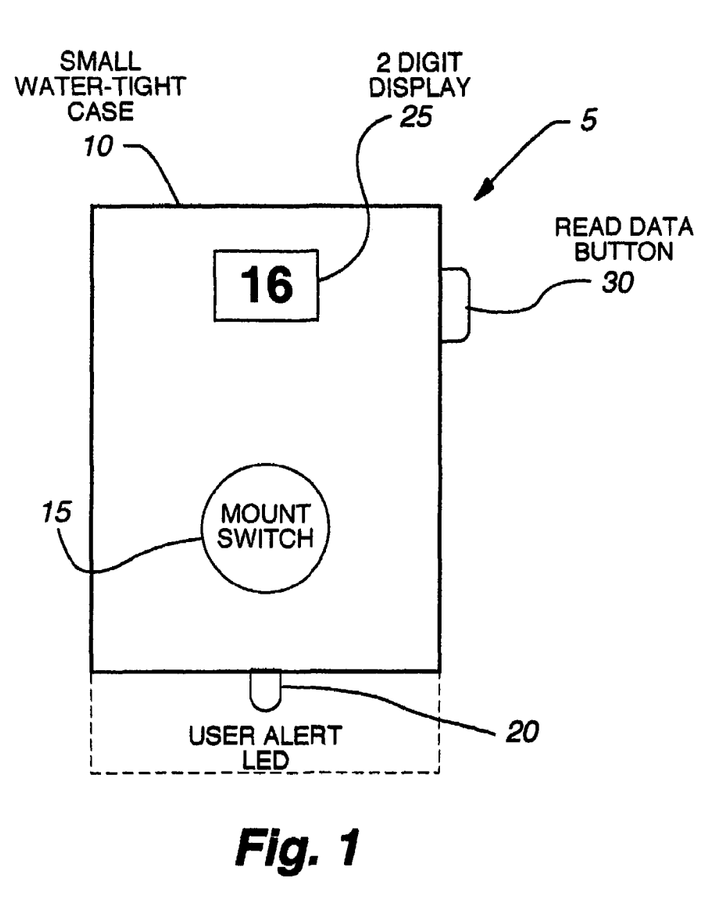
FIG. 1 is a top view of a preferred embodiment of the estrus detection device of the instant invention.
Figure 5A:
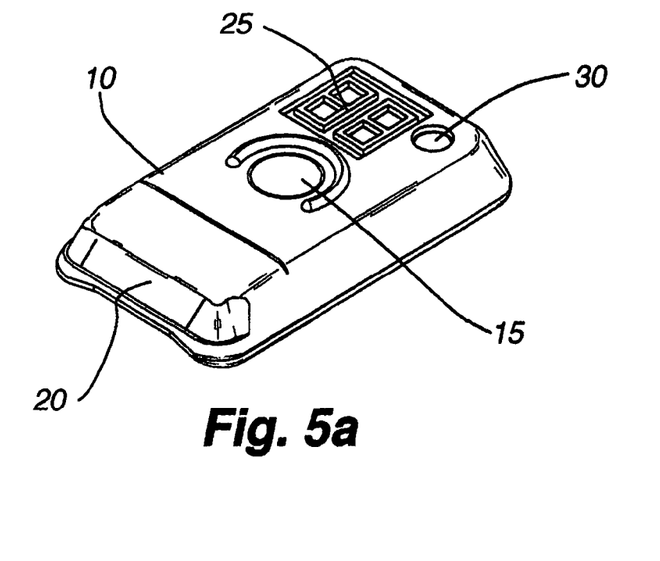
FIG. 5a is a perspective view of a preferred embodiment of the estrus detection device of the instant device depicted in FIG. 1.
Figure 5B:
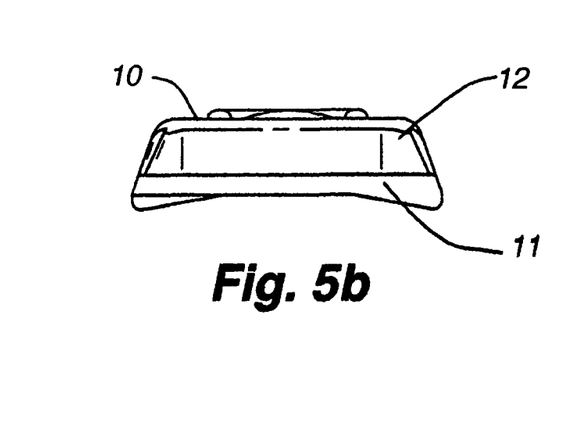

Moving to FIG. 1, shown is a detailed external, top view of first preferred embodiment. A generally rectangular box shaped detection device 5. Said device provides six generally rectangular surfaces (see FIG. 5); a lower surface that rests generally horizontally against the tail head area of a cow, an opposite facing upper surface upon which a pressure sensitive switch and digital display are located, four generally vertical surfaces connecting and defining the perimeters of each of the lower and upper surfaces one of which houses a recessed read data switch 30 and another of which houses at least one visible display means.

Figure 2:
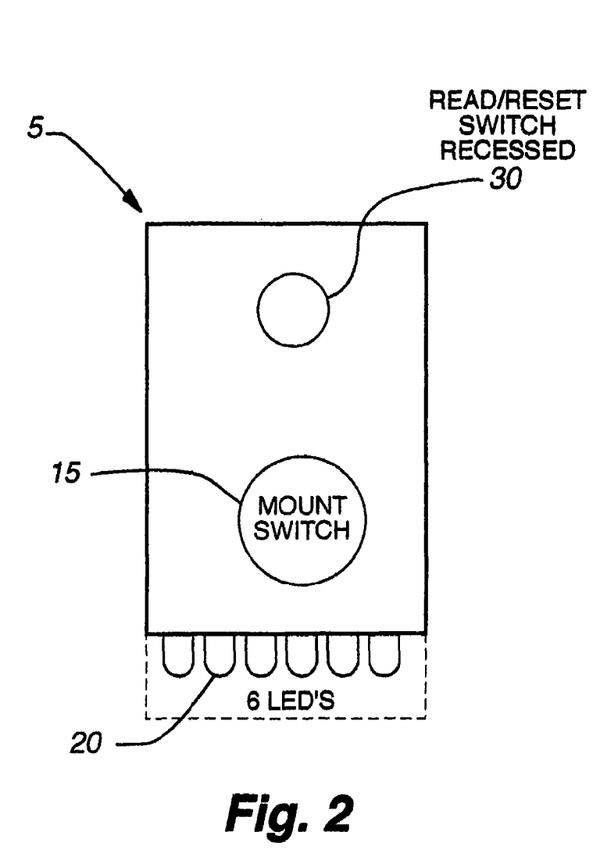
FIG. 2 is a top view of another preferred embodiment of the estrus detection device of the instant invention.
Figure 6A:
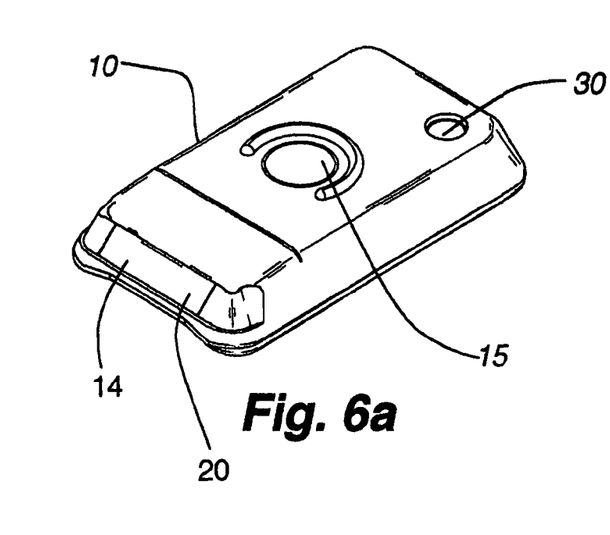
FIG. 6a is a perspective view of a preferred embodiment of the estrus detection device of the instant device depicted in FIG. 2.
Figure 6B:
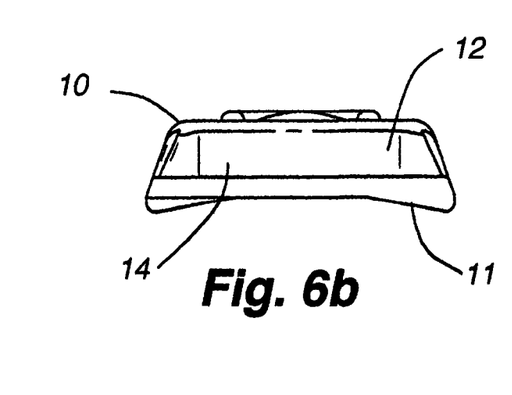

Another preferred embodiment's detailed external, top view of a generally rectangular box shaped detection device 5, as shown in FIG. 2, provides a pressure sensitive switch 15 and a recessed read/reset switch 30 on the upper surface. Said device carrying the same general shape as the first embodiment, see FIG. 6.

Figure 10:
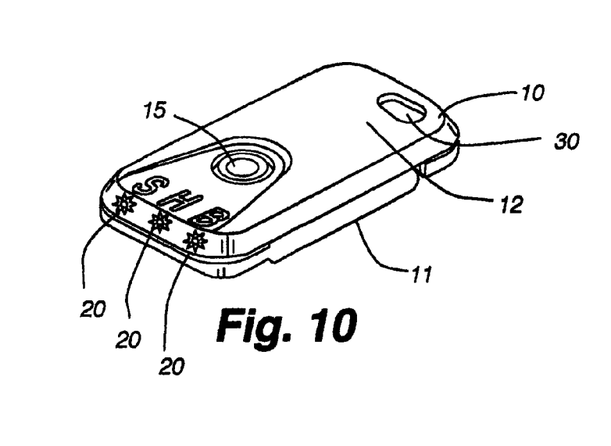
FIG. 10 is a perspective view of another alternate preferred embodiment of the estrus detection device of the instant device.

Yet another preferred, simple-to-use, embodiment is shown in FIG. 10 in which 3 display LEDs 20 are employed. One LED 20 is activated upon commencement of mounting activity (e.g. "suspect estrus"); the next LED 20 is activated when qualified mounting activity occurs (e.g. "confirmed estrus"). That activity which is determined to meet the device's predetermined and preset thresholds, e.g., 3 mounts in 4 hours. The last LED 20 is activated when the animal is within the range of time for breeding, thus, indicating to the herdsman to breed the animal at the next opportunity (e.g. "optimum time to breed").

The details of the basic structure of the preferred embodiment of the invention include two major portions: the housing 10 and the electronic components 13 housed therein. The injection molded housing 10 is constructed of plastic or like material, preferably transparent, comprising a base portion 11 and cover portion 12, FIGS. 5a and 6a. The base portion 11 is a planar, generally rectangular section upon which the electronic circuitry components 13 are mounted. The cover portion 12 is generally concave and of a shape and size that corresponds to the base portion 11 such that via conventional secondary injection molding techniques, it is capable of being hermetically sealed to the base portion 11 and creating a water- and weather-resistant housing 10. The transparency of the entire housing is not a necessary defining feature of the invention; a viewing window or windows 14 may be strategically placed in an opaque housing via custom injection molding techniques accepted in the art.

Figure 11A:
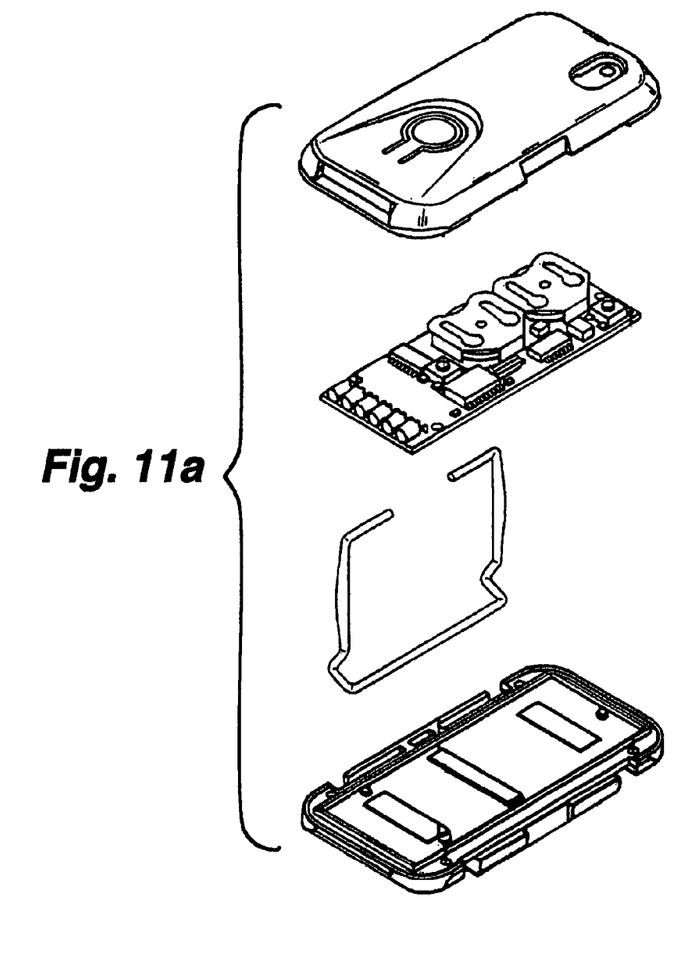
FIG. 11 is a perspective view of integral combination of the base portion, internal electronics and cover portion of the instant device.
Figure 11B:
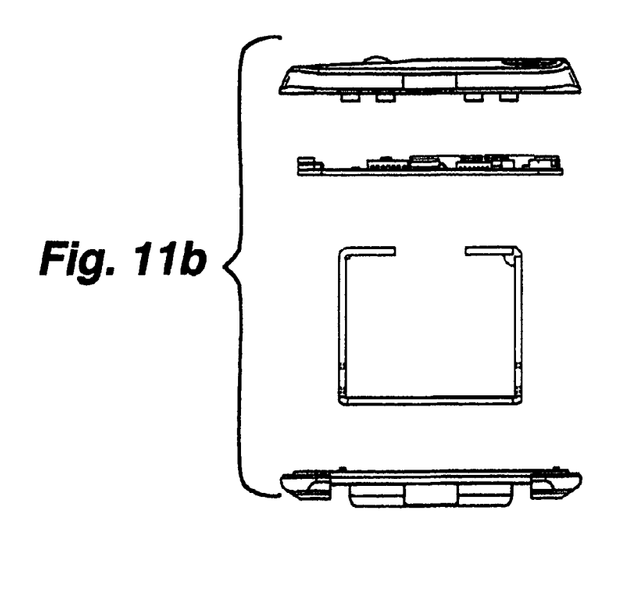

Generally, the base portion 11 of the housing is connectable to the cover portion 12 using, for example, standard injection molding techniques. In connection with holding a power source, e.g., a battery or batteries, in a desired portion relative to the housing 10, supports may be provided that are attached to, for example, a vertical wall of the housing, which is joined to the base portion 11. Before the base portion 11 is connected to the cover portion 12 creating a sealed housing 10, electronic componentry 13, including a printed circuit board (PCB), which includes the necessary circuitry involved in the instant estrus detection functions, is positioned in the housing. See FIG. 11. This circuitry includes a pressure sensitive switch assembly that is activated during a cow mount and is engaged by a switch contact section. Battery connectors are attached to the PCB and provide the electrical connection between the battery and PCB circuit paths in order to supply a power source to the circuitry components 13. After the electronic portion 13 of the device is fully assembled, the base portion 11 is connected to the cover portion 12 and the device may be placed into the pocket area of a pouch for proper positioning on an animal.

Figure 3:
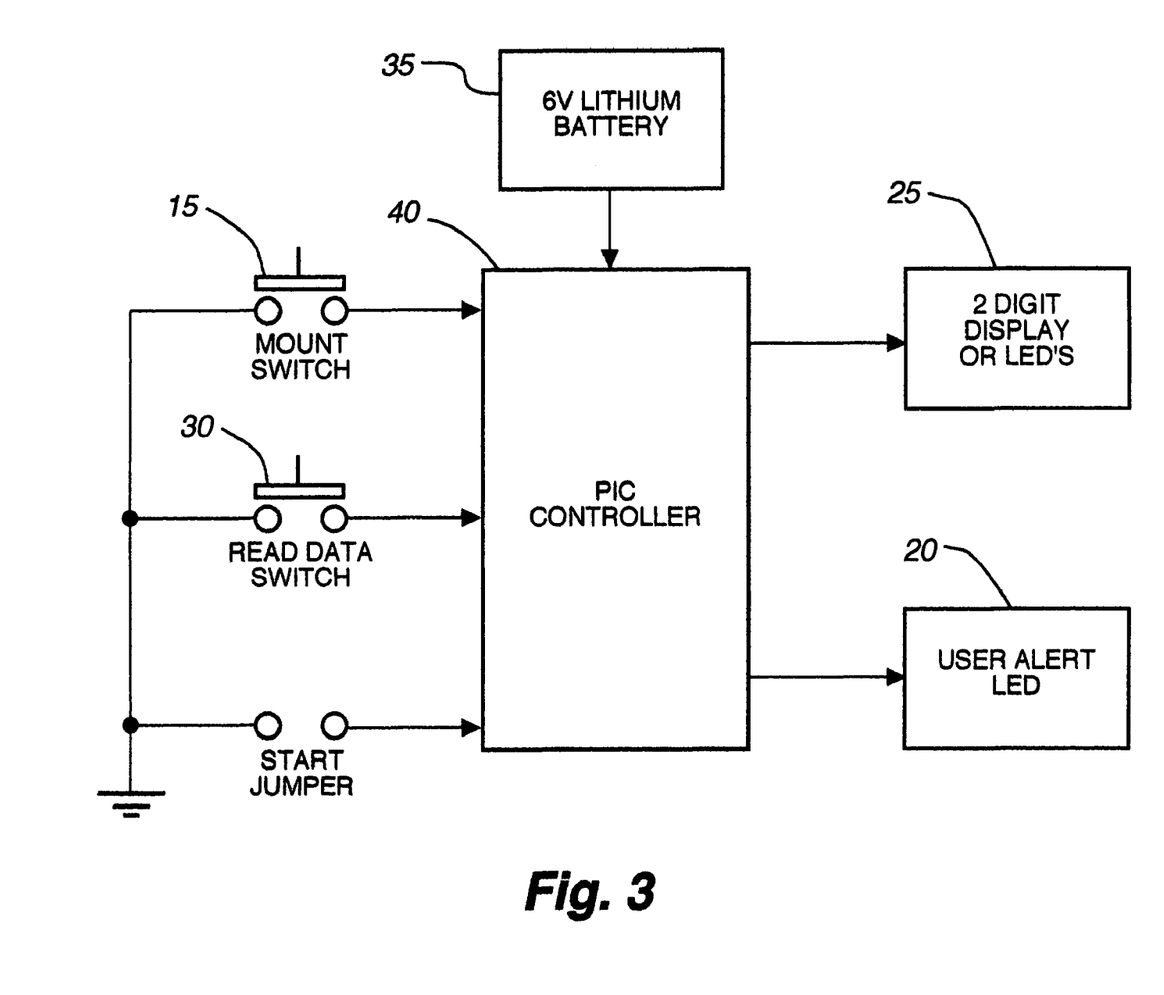
FIG. 3 is a block diagram representation of the circuitry of the preferred electronics of the instant invention.

FIG. 3 sets out portions of electronic componentry of a preferred embodiment which include a single internal controller chip 40, a power source 35, a pressure sensitive switch 15, a read data switch 30, a digital display 25 and a visible indicator or a plurality of visible indicators 20. Both the pressure sensitive switch 15 and the read data switch 30 feed directly into the controller chip 40, where switch de-bounce and qualification is performed. The controller chip 40 then actuates and operates the digital display 25 and the visible indicator or the indicators 20. The controller 40 may also directly drive the display 25. Each actuation of the pressure sensitive switch 15 caused by mounting activity sends a signal to an incremented counter. The controller chip 40 debounces the input signal, thereby preventing the recordation of any signal of duration less than a preset threshold, e.g. 3 seconds. In addition to the above components of the device, additional resistors and/or capacitors may be added to the system as necessary. Furthermore, unnecessary or redundant components may be left out of the system.

In a preferred embodiment, the pressure sensitive switch 15 is activated during a mount. Activation of the pressure sensitive switch 15 during a mount causes power from the battery 35 to be applied to the circuitry of the device. In a stand-by mode in which the pressure sensitive switch 15 assembly is not activated, no battery power is being applied to the device circuitry; so that reduced power consumption is achieved, thereby extending the life of the battery. Upon switch closure of greater than a predetermined amount of time, power is applied to a counter that essentially counts pulses related to the time duration of the mount. That is, the counter continues to count pulses beginning with the switch closure until it opens at the end of the mount.

At the same time that the counter is counting to keep track of the heat mount duration, a timer circuit is also powered on or activated. The timer circuit includes power down delay circuitry that is used in maintaining necessary power to the device after the pressure switch has been deactivated. In addition to the duration time, a battery power status unit may be added to the system. The system provided by this unit may be used to inform the user that the battery is low or should be replaced.

In connection with the analysis involving heat mount related data, it may not be necessary to keep track of the complete mount time. That is, each mount that exceeds a predetermined time interval may be given the same significance in the analysis. If the mount continued for than a predetermined time, for example, 5–7 seconds, it may not be necessary to keep track of the mount time of greater duration.

The timer circuit may also include circuitry that compensates for momentary deactivation of the pressure switch during the occurrence of a single mount. During a mount, the force applied by the mounting animal to the pressure switch may momentarily be lost, for example, due to movement or shifting by the mounting cow. This temporary loss of force may cause the electrical contact of the pressure switch to open, leading to discontinuance of the counting by the counter and an inaccurate indication that the mount has been completed. In one embodiment, the timer circuit utilized a threshold related time and, unless this predetermined threshold magnitude of time is exceeded due to deactivation of the pressure switch, the counter continued to count and keeps track of time in accordance with the occurrence of a single mount. That is, instead of the momentary deactivation of the pressure switch causing an indication that the mount has been completed, the timer circuit maintains the counting and the monitoring of the mount time, unless the predetermined threshold of time was exceeded.

In a more preferred embodiment, the hardware circuits and operation thereof in connection with the device are substantially replaced by a programmed microcontroller 40; for example, a microcontroller performs the counting operation to monitor heat mount time. In conjunction with and in addition to analyzing fundamental mount data, i.e., the duration of heat mounts during the relevant monitored period, the monitoring of additional data and/or other parameters may be programmed into the microcontroller in order to accurately determine the optimum time to breed. Additional data to be monitored may include, for example, ambient temperature, patterns of known activity, number of heat cycles, mountor versus mountee activity, number of animals, age, location, breed and humidity.

The instant device is operated by a power source 35, for example, a button-cell type battery. Such type of battery keeps the profile of the device to a minimum. Further, the life of the device may be adjusted, up or down, by battery selection. Further a plurality of low voltage, button-cell batteries in series may be used to increase power and minimize the device profile. Accordingly, the device as a whole may be considered disposable and employ a battery having a specific life. Alternatively, separately encasing the battery or battery receiving means enables replaceable and/or rechargeable power sources, thereby extending the life of the device.

Figure 4:
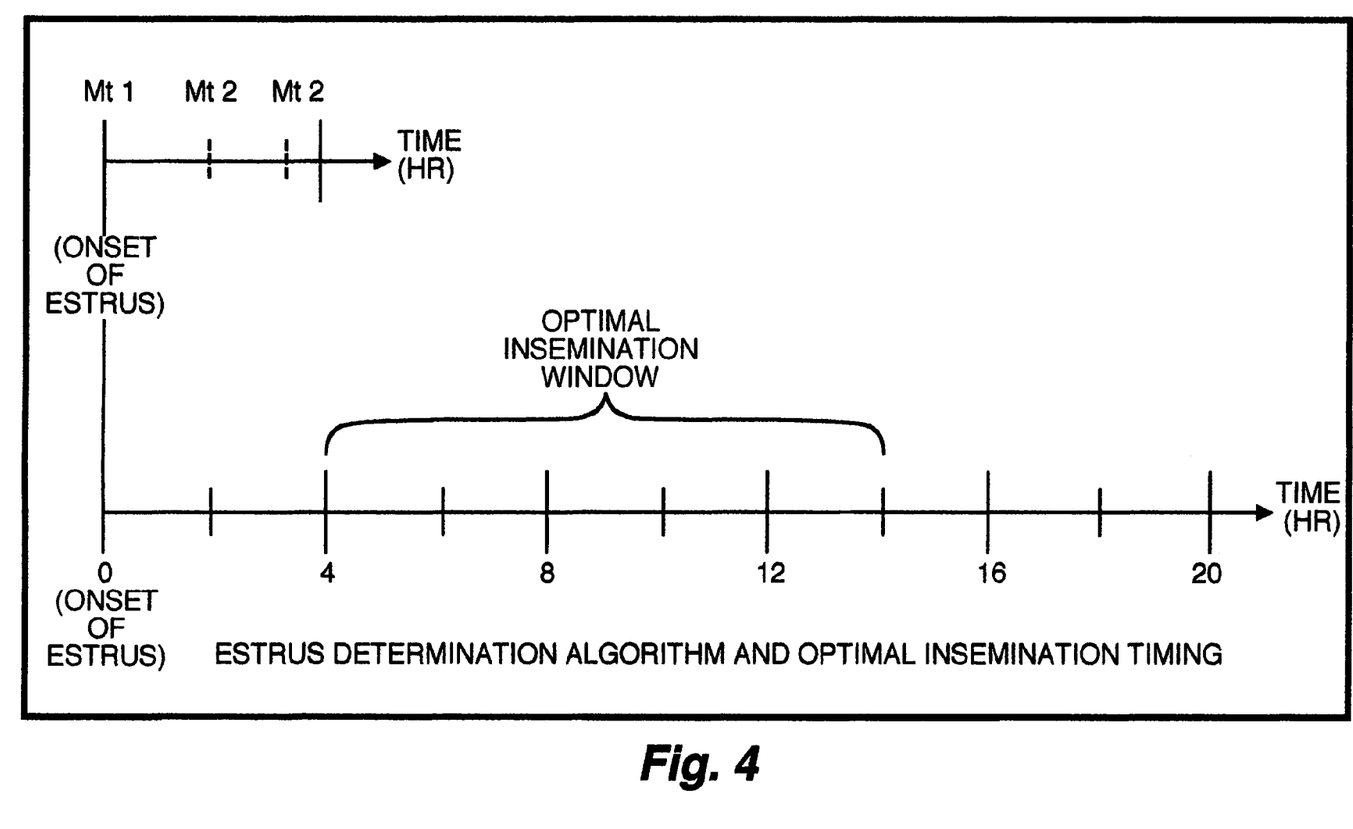
FIG. 4 illustrates diagrammatically the estrus determination algorithm and optimal insemination timing upon which the invention is based.
Figure 7A:
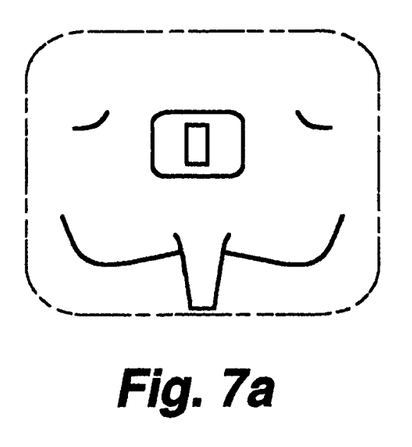
FIGS. 7a–d are perspective views illustrating the optimal placement of the device employing a patch assembly (a), a tail-wrap assembly (b), a tail-sheath assembly (c) and a combination thereof (d).
Figure 7B:
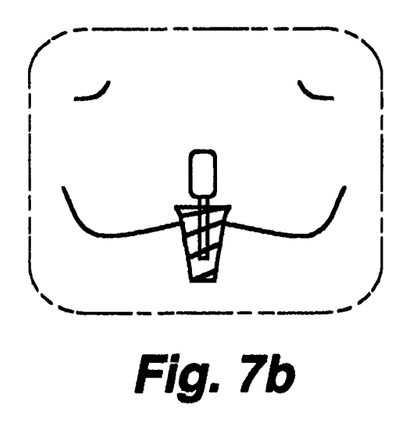
Figure 7C:
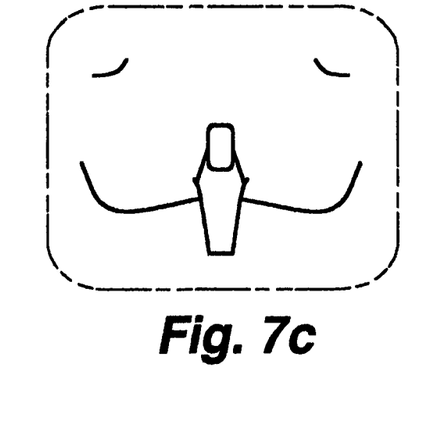
Figure 7D:
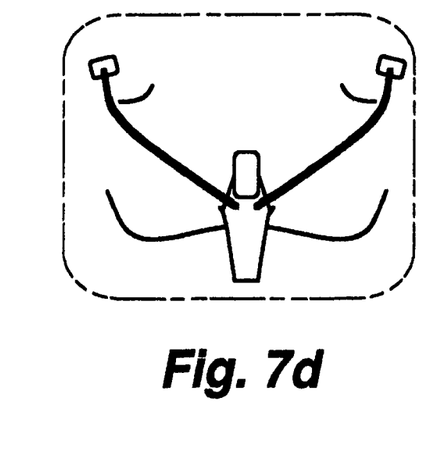

The preferred device is programmed to apply an algorithm, e.g., 3 mounts in 4 hours of actual mounting activity, to determine estrus and the optimal breeding time. The estrus determination algorithm and optimal insemination timing based thereon are set forth in FIG. 4; 3 mounts per 4 hours must be logged before the device's indicator function is actuated. To be actuated by mounting activity, the device must rest strategically on the tail head of a cow. Methods of doing so include, for example, an adhesive patch assembly (FIG. 7*a*), a tail-wrap assembly (FIG. 7*b*), a tail-sheath assembly (FIG. 7*c*) and a combination thereof (FIG. 7*d*), each adapted for retaining the device in proper position. FIG. 7d incorporates aspects of each attachment assembly into a single assembly. Specifically, it incorporates a tail-wrap with at least one patch into the same assembly. It further comprises at least one adjustable shock absorbing connection element. Accordingly, improper positioning prevents mounting activity actuation of the device and failed estrus detection.

The bulk of the apparatus is composed of a material that facilitates the necessary rigidity and robust structure to withstand multiple mounting activity, for example, plastics, rubbers or elastomers. The preferred material, ABS plastic, is a chemically stable, heat and cold resistant material that is lightweight, semi-rigid, resilient and sturdy. That is, it is unaffected by such things as extreme temperatures or repeated mounting activities. More specifically, it may be formulated so as not to split, splinter or crack and to possess significant fire retardant properties. Therefore, the assemblies made according to the instant invention last a long time and are completely safe for their intended use.

The device disclosed herein is, in use, is semi-permanently affixed to the tail-head area of the animal with assemblies as described supra. FIGS. 7a–d show the estrus detector optimally positioned in the tail-head area of a monitored cow. The detector preferably rests within a protective pouch of an attachment assembly, which may itself be transparent, so as to not obstruct an observer's view of the device. Alternatively, the pouch may be constructed from, for example, nylon, canvas, composite textile or other fabric or combination thereof, and provide a device viewing window.

Until mounting behavior activates the pressure sensitive switch 15, the controller 40 powers down and/or reverts to what is generally considered sleep mode. Upon activation, and after the preprogrammed algorithmic thresholds have been met, a visible indicator 20 or indicators are activated. The preferred embodiments employ any long life battery, such as, lithium. Long life being defined as a battery having a life of approximately 50 mA-hour or more capacity. For example, the estimated hour capacity of the preferred BR2032 Button Cell battery then is 190 mA-hours. At 25° C., the described device then has a minimum shelf life of 10 years, and an operating outdoor life of approximately 2.2 years in ambient temperatures ranging from −40 to 85° C. The operating and shelf lives of the device may be altered based on, for example, battery selection, visible indicator pulse rate and ancillary electronic componentry. Pulsing and/or pulse rate is known to increase visibility to the human eye, and therefore, in preferred embodiments is adjusted accordingly.

In operation, the pressure sensitive switch 15 is activated by the weight of a mounting herdmate when mounting activity persists for a preset minimum time period, for example 3 seconds. A count of individual mounts meeting the minimum threshold is recorded on an incremented electronic counter. A preset time threshold for depression of the pressure sensitive switch 15 avoids false counts. At a preset count threshold, an electronic timer begins counting hours and minutes from activation of the pressure sensitive switch 15, and may round to the nearest hour for a 2-digit display 25, and a visible indicator 20, such as LED display, begins pulsing indicating mounting activity. At such time, the device is read by the herdsman using the read data switch 30, salient data independently recorded and the device reset.

In a second preferred embodiment, a plurality of, for example 6, LED displays 20 replace the digital display and single LED. Upon activation based on the same preset threshold, the LED displays pulse. Each LED representing a 2 count and all LEDs pulse for counts per hours of 12 and above. Thus, as the device records an increased amount of mounting activity, the number of LEDs pulsing increases. By simple observation of the number of LEDs pulsing, it is possible to see the amount of mounting activity recorded and determine appropriate insemination timing.

Recordation of salient data may be achieved, for example, manually, via passive RF communication or via infrared port. The device may be fitted with appropriate ports for electronic transfer.

In this embodiment, upon observation of the pulsing LED or LEDs, the herdsman user approaches the device, and in the first embodiment reads, the digital display before depressing the read data switch to obtain mount and timer information. Depressing the read data switch once, preferably located on the side of the device, displays the mount count from 1–99; depressing the switch a second time to displays the number of hours elapsed since a first qualified mount. Pressing the switch further toggles between the mount count and time displays. Depressing the switch simultaneously with the mount switch resets the mount counter and timer to zero. Alternatively, a time-threshold may be set, for example 3 seconds, after which depression of only the read data switch resets the mount counter and timer.

Referring back to the first described preferred embodiment, a digital display, preferably 2-digit, is the device profile defining component. The preferred QT MAN4900A display is approximately 0.2 inches tall and has a standard 0.065 PCB thickness. The resulting housing then is approximately 1.50"W×4.00"L×0.40–0.45"D. The cover portion of the housing further comprises flexible portions over the switches produced via secondary injection molding techniques. Said flexible portions are preferably constructed of elastomer material and hermetically sealed. Two-digit digital display is provided by 2, 7 segment LED displays. However, digital display may be achieved by other means, such as liquid crystal or light-emitting diode. The use of LED display is merely representative.

In an alternate preferred embodiment, multiple LEDs are located at one end within one of the two, shorter length vertical surfaces of the device. The use of multiple LEDs facilitates a smaller statured device than that of the first described preferred embodiment. For example, using 6 individual LEDs, the device's measurements are reduced to approximately 1.20"W×3.00"L×0.30"D.

The visible indicator or indicators in each of the preferred embodiments are provided by LED displays. In one of the preferred embodiments, a single LED is employed with the digital display. Another embodiment employs 6 individual LED displays in sequence, creating a bar graph row of LED indicators. When activated, the visible displays pulse. A diagnostic function sequence may be programmed for operation confirmation and/or battery level indication employing an alternate pulsing pattern. In yet another preferred embodiment, three LED displays are employed to indicate different time periods during estrus corresponding to suspected heat, confirmed (standing) heat and breeding time, as shown in FIG. 10.

The pressure sensitive switch 15 is connected via appropriate circuitry to an internal controller chip 40, set forth more fully with respect to FIG. 2. The electronic portion 13 of the device 5 is hermetically sealed within the housing 10 creating a water-resistant housing. A pressure sensitive switch 15 is activated, at a flash level of approximately 4 mA per flash, for a 0.1 second flash every 1.5 seconds. Based on a 21 day cycle including a confirmation cycle, the LED 20 flash usage is approximately once every 33 days standing estrus is defined when a cow has 3 standing events in any 4-hour period; fewer standing events are suspected estrus—quantitative, linear logistic regression.

Figure 8A:
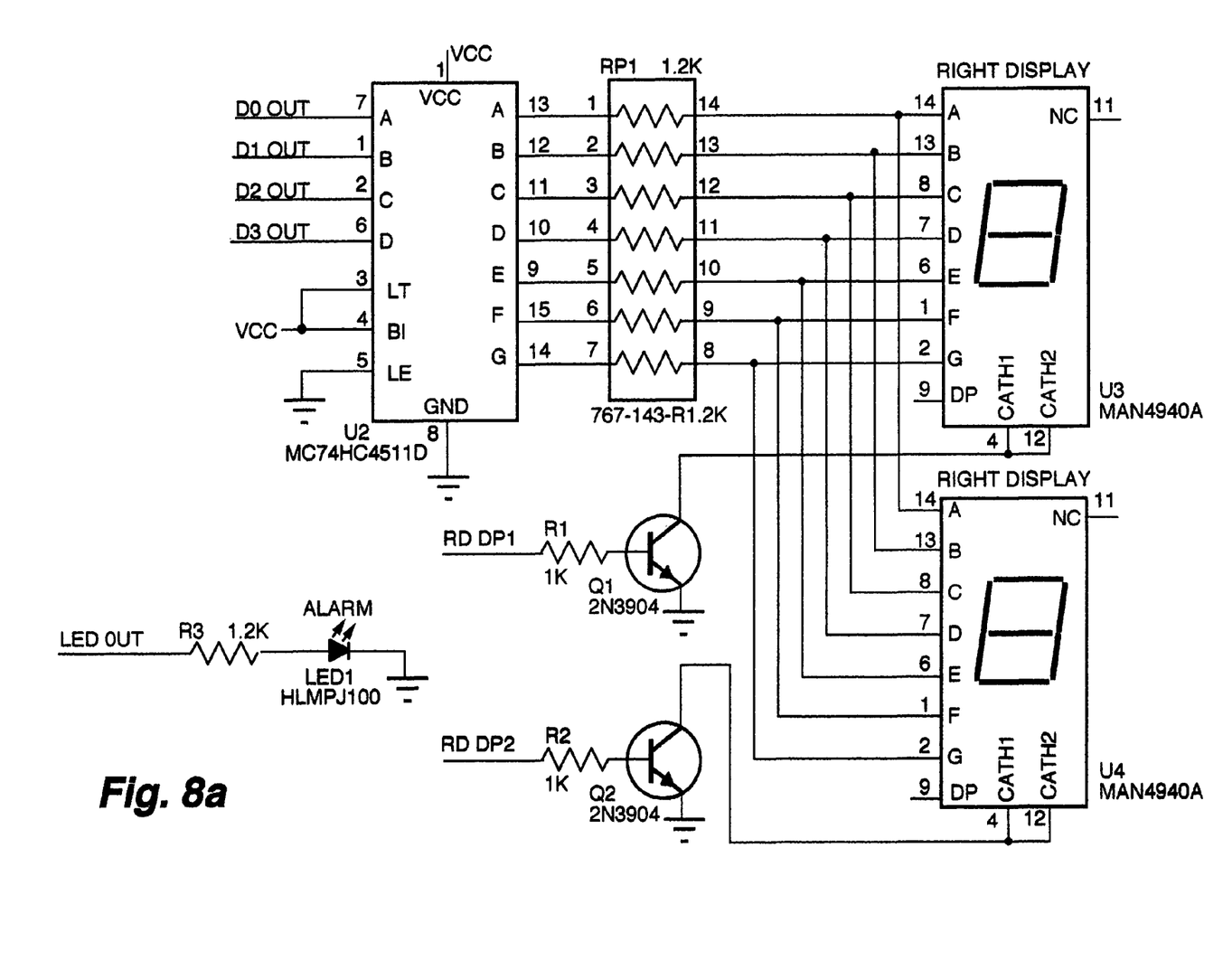
FIG. 8 is a schematic of the printed circuit board layout a preferred embodiment of the device.
Figure 8B:
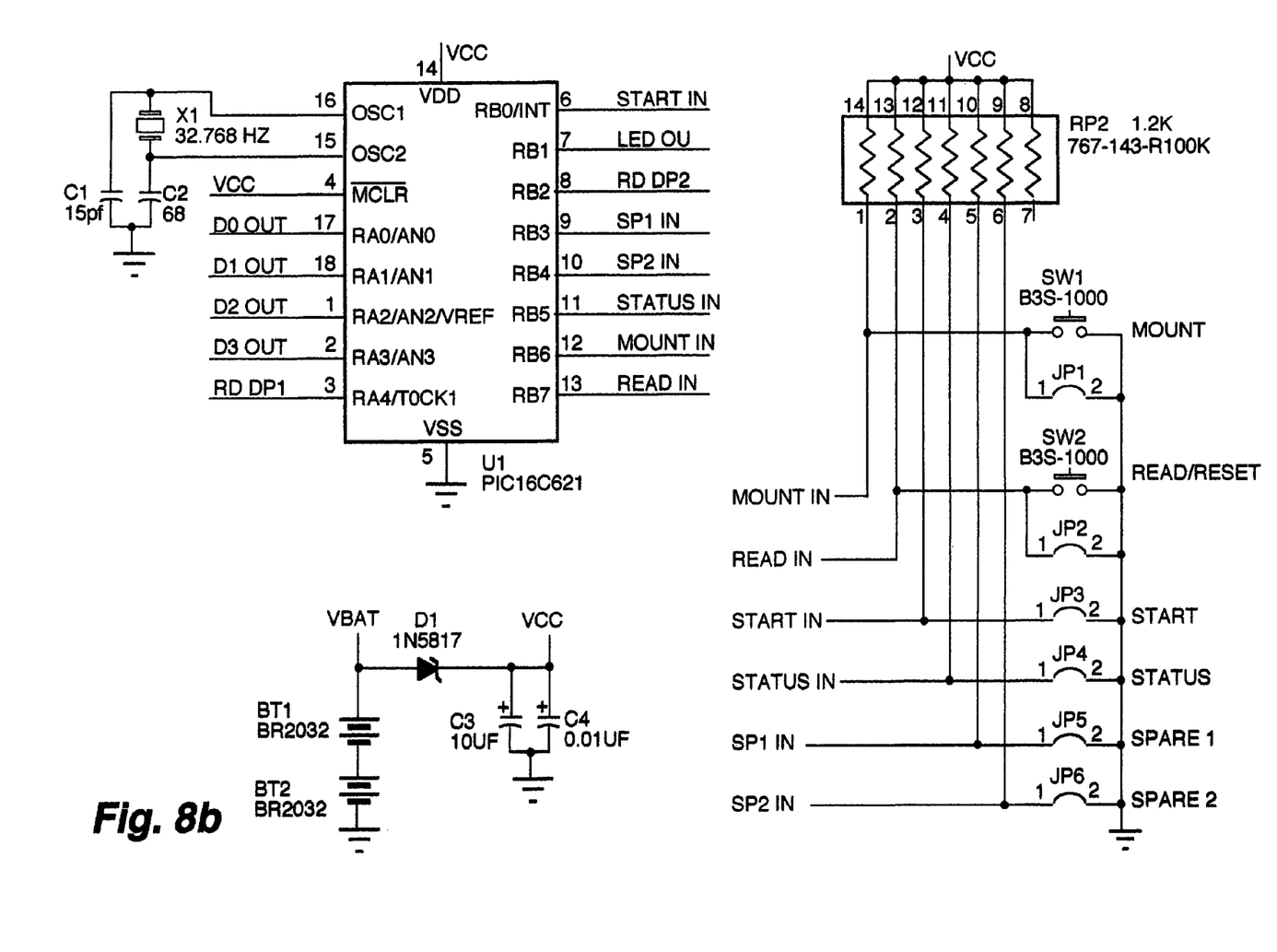
Figure 9A:
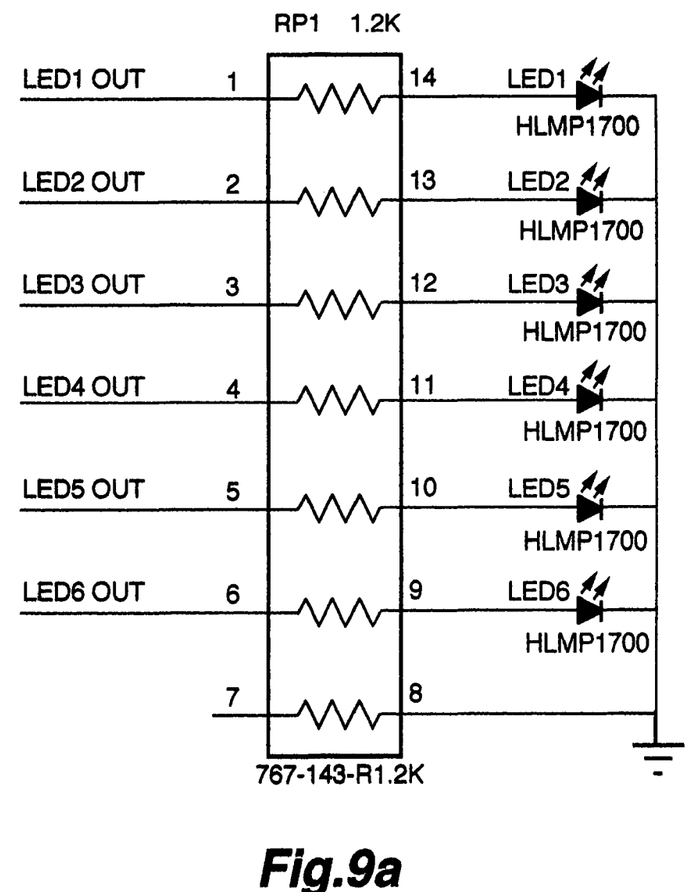
FIG. 9 is a schematic of the printed circuit board layout of the second preferred embodiment of the device.
Figure 9B:
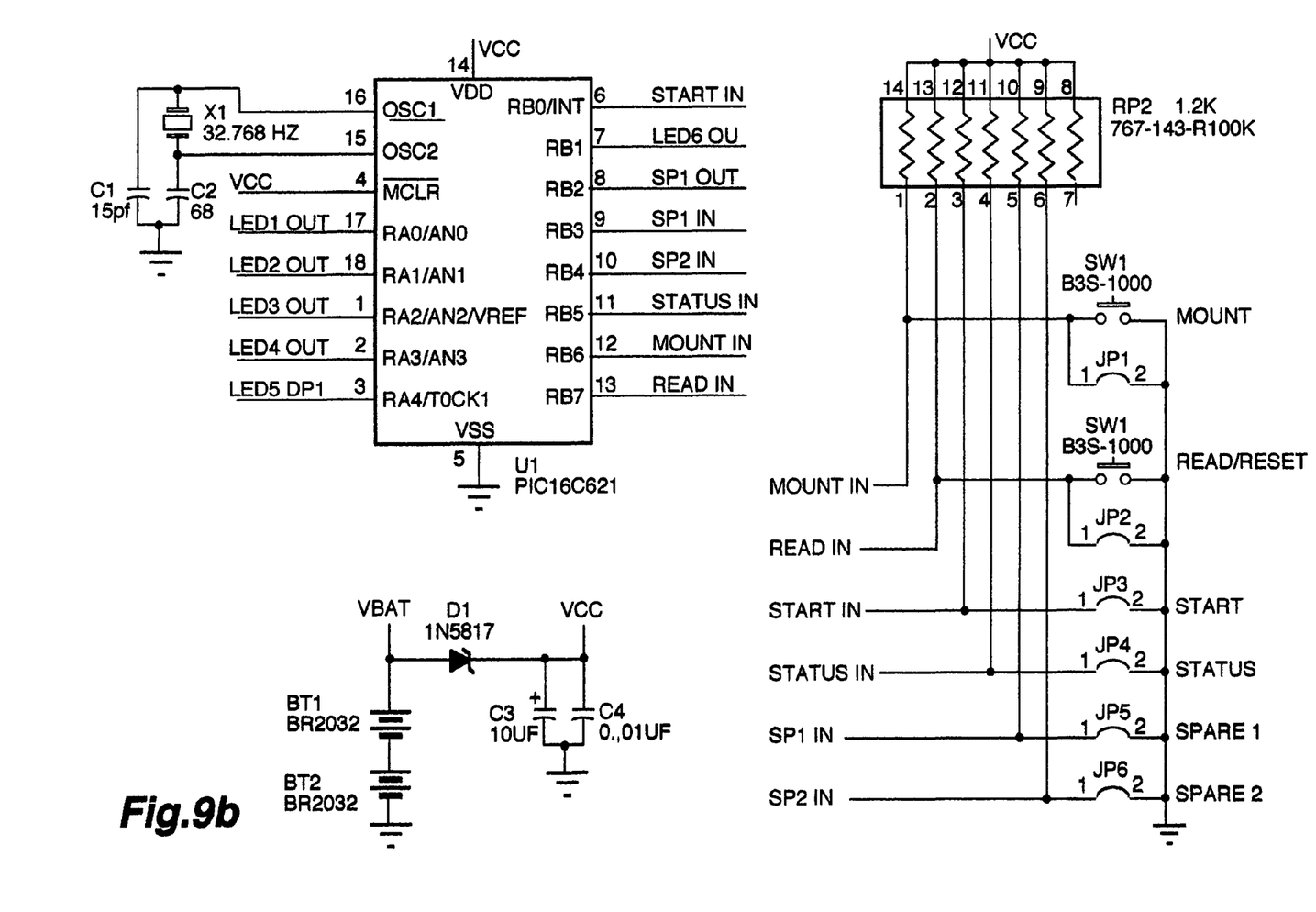

FIGS. 8 and 9 schematically set forth preferred circuitry of the preferred device embodiments' printed circuit board (PCB) layouts. Said schematics are illustrative only; any number of functional PCB layouts may be provided by one skilled in the art. With respect to the processing and/or analysis of heat mount data for making a determination regarding breeding time for a subject cow, an onset of estrus is first detected by determining whether a predetermined threshold was met or occurred. This predetermined threshold related to an onset of estrus based on a predetermined minimum number of heat mounts occurring within a predetermined time interval. If this predetermined threshold is met, further analysis is conducted to obtain a peak estrus value that is useful in determining an optimal, or at least desirable, breeding time. Such a predetermined threshold falls within the range of at least three heat mounts within about four hours and four heat mounts within at least about three hours. If this predetermined threshold is not met, the subsequent analysis is not performed. However, when the predetermined threshold is satisfied, further analysis is conducted to determine a peak estrus value (PEV). In that regard, it has been noted that the distribution of mounting behavior within estrus, as determined by summing the predetermined threshold, appears to fit a substantially symmetrical distribution, with peak estrus centrally located at the time of peak mounting behavior. In the preferred embodiment, because such mounting behavior is symmetrical, the mean mounting behavior is found at the time average of the heat mounts. If there are N mounts at time $T(i)$, the peak estrus value would occur at a time: $T_{pev} = \Sigma T(i)/N$. In a preferred embodiment, with it being known that the longest and most significant mounts will occur at peak estrus, when the estrus hormones are expressed at their highest levels, this average can be weighted according to the duration of the mounts. If there are N mount of duration $D(i)$ occurring at times $T(i)$, the peak estrus occurs at time $T_{pev} = \Sigma[T(i)*D(i)]/\Sigma D(i)$. It is understood from the above discussion that each of the two expressions determines a time value at which peak estrus occurs, and therefore an optimum time to breed, with the second expression weighting the time values by a corresponding duration value. The weighted time value is believed to result in a more accurate representation of peak estrus for the subject animal.

It is apparent that the present invention provides a self-contained electronic device for accurate detection of estrus through 24-hour automatic surveillance, thereby reducing labor requirements and increasing production. Furthermore, the instant invention may clearly be practiced in conjunction with any type of non-human animal exhibiting estrus cycle and mounting related behavior. While specific embodiments of the invention have been illustrated and described herein, these should not be construed as limitations on the scope of the invention, but rather an exemplification of the preferred embodiments thereof. Numerous variations are possible and will occur to those skilled in the art. It is therefore to be understood that the appended claims are intended to cover all such modifications and changes as fall within the true spirit and scope of the invention.

The invention claimed is:

1. An electronic estrus detection device for determining optimum breeding time in an animal, said electronic estrus detection device comprising:

a housing for releasable placement on an animal; and a self-contained electronic means operatively associated with said housing for indicating optimum breeding time in the animal, wherein said self-contained electronic means detects and processes information related to number, duration, and frequency of mounts on said animal, and wherein said electronic means electronically compares detected and processed information on the animal to a predetermined pre-set threshold for number, duration, and frequency of mounts that indicates optimum breeding time, wherein only when the detected and processed information for said animal exceeds the pre-set threshold will an indication of optimum breeding time be expressed by the electronic means, and wherein the self-contained electronic means continuously detects and processes information to calculate and indicate confirmed estrus, suspect estrus and optimum breeding time.

2. The estrus detection device as defined in claim 1, wherein said electronic means further processes information to determine if said duration of said mounts meets a preset threshold of time and if a preset number of said mounts occur within a predetermined period of time.

3. The estrus detection device as defined in claim 2 wherein said optimum breeding time is a predetermined range of time from the first of said preset number of said mounts meeting said preset threshold and occurring within said predetermined period of time.

4. The estrus detection device as defined in claim 2 wherein said preset threshold of time is about 3 seconds.

5. The estrus detection device as defined in claim 2 wherein said preset number of mounts is 3 mounts and said predetermined period of time is about 4 hours.

6. The estrus detection device as defined in claim 1, wherein said electronic means includes a microprocessor.

7. The estrus detection device as defined in claim 1, wherein said electronic means includes at least one battery.

8. The estrus detection device as defined in claim 1, wherein said electronic means includes a pressure sensitive switch.

9. The estrus detection device as defined in claim 1, wherein said electronic means includes a visible display means that indicates optimum breeding time.

10. The estrus detection device as defined in claim 9, wherein said visible display means is at least one LED.

11. The estrus detection device as defined in claim 9, wherein said electronic means includes a visible display means that indicates mount count and hours elapsed since a first mount of sufficient amount of time to exceed a pre-set threshold of time.

12. The estrus detection device as defined in claim 1, further comprising a reset means for resetting said electronic means.

13. The estrus detection device as defined in claim 1, wherein the pre-set threshold for number and frequency of mounts is three mounts that occur within a four hour time period.

14. The estrus detection device as defined in claim 13 wherein the pre-set threshold for number, duration, and frequency of mounts is three mounts that last at least three seconds each that occur within a four hour time period.

15. The electronic estrus detection device as defined in claim 1 further comprising:

an indicating means for indicating suspect estrus, confirmed estrus and optimum time to breed.

16. The estrus detection device as defined in claim 15 wherein said indicating means is located on the rear of said housing.

17. The estrus detection device as defined in claim 15 wherein said indicating means comprises at least one LED.

18. The estrus detection device as defined in claim 15 wherein said indicating means is 3 LED's, each of said 3 LED's indicating either suspect estrus, confirmed estrus or optimum time to breed.

* * * * *